United States Patent [19]
Arosio

[11] 3,818,180
[45] June 18, 1974

[54] HEAT INSULATED CONTAINER FOR POTS

[76] Inventor: Giovanni Arosio, Via Ciro Menotti, 20035 Lissone, Milan, Italy

[22] Filed: Oct. 11, 1972

[21] Appl. No.: 296,534

[52] U.S. Cl. ............ 219/386, 206/46 FC, 215/13 R, 219/402, 219/419, 219/432, 219/433, 219/441, 219/524, 220/17

[51] Int. Cl. ............................................ F27d 11/02

[58] Field of Search .......... 219/385, 386, 387, 390, 219/402, 403, 404, 415, 417, 418, 419, 430, 432, 433, 435, 436, 437, 439, 441, 442, 524, 525, 528, 530, 535, 540; 106/122; 215/13 R; 312/214; 248/146; 211/71; 220/16, 17; 206/4, 46 FC

[56] References Cited
UNITED STATES PATENTS

| | | | |
|---|---|---|---|
| 993,178 | 5/1911 | Lamont | 219/402 |
| 1,027,739 | 5/1912 | Lauzon | 219/403 |
| 1,478,919 | 12/1923 | Sacerdote et al. | 219/402 X |
| 1,661,464 | 3/1928 | Campbell | 219/403 |
| 1,683,889 | 9/1928 | Hayne | 219/386 X |
| 1,979,222 | 10/1934 | Goodwin | 219/441 X |
| 2,431,582 | 11/1947 | Page | 219/442 |
| 2,499,690 | 3/1950 | Spiess | 219/415 |
| 2,507,425 | 5/1950 | Swartout | 220/17 X |
| 2,515,709 | 7/1950 | Heard et al. | 220/17 |
| 2,526,476 | 10/1950 | Ham | 219/403 X |
| 2,656,946 | 10/1953 | Clarke | 220/16 |
| 2,836,696 | 5/1958 | Ratchford | 219/390 |
| 2,944,694 | 7/1960 | Kinsey | 220/17 |
| 3,038,986 | 6/1962 | Molitor | 219/387 |
| 3,048,267 | 8/1962 | Starzec | 206/46 FC |
| 3,051,582 | 8/1962 | Muckler et al. | 99/171 |
| 3,113,667 | 12/1963 | Knapp et al. | 206/46 FC |
| 3,130,288 | 4/1964 | Monaco et al. | 220/17 X |
| 3,154,668 | 10/1964 | Swartz | 219/387 |
| 3,155,260 | 11/1964 | Widener | 215/13 |
| 3,266,623 | 8/1966 | Pofere | 220/17 X |
| 3,281,579 | 10/1966 | Glicksman | 219/535 |
| 3,313,438 | 4/1967 | Piker | 215/13 R |
| 3,315,064 | 4/1967 | Carlberg et al. | 219/387 X |
| 3,413,442 | 11/1968 | Buiting et al. | 219/390 |
| 3,539,773 | 11/1970 | Wilson | 219/432 |
| 3,585,357 | 6/1971 | Mandell et al. | 219/387 X |
| 3,613,872 | 10/1971 | Donnelly | 206/4 |

FOREIGN PATENTS OR APPLICATIONS
755,128   8/1956   Great Britain ..................... 219/387

*Primary Examiner*—Volodymyr Y. Mayewsky
*Attorney, Agent, or Firm*—Michael S. Striker

[57] ABSTRACT

Heat insulated container for pots, adapted to be inserted into a cabinet or to be used as such in order to avoid heat dispersion of the liquid contained in said pot, wherein there is included a block 1, consisting of heat-insulating material, provided with an upper portion 2 consisting of the same material, both showing a parallelepipedal shape, in which the block is provided in the central portion with a recess, lined with a plastic sheet, and having a configuration like the pot it should receive, the upper portion being provided with a seat to receive the cover of the pot.

1 Claim, 5 Drawing Figures

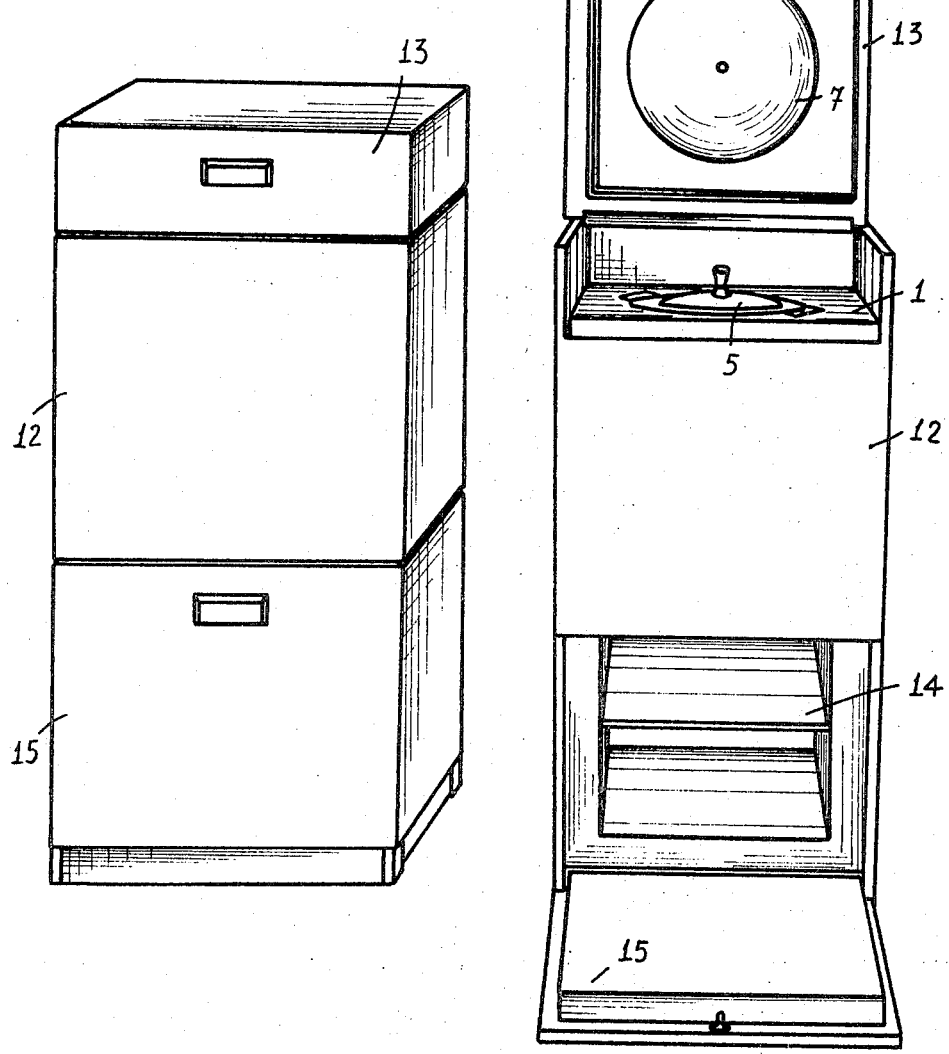

HEAT INSULATED CONTAINER FOR POTS

This invention relates to a heat insulated container for pots, and more particularly a heat insulated container for pots, adapted to be inserted into a cabinet, which strongly limits the heat dispersions of the boiling liquid, being contained in the pot itself, thereby ensuring the cooking of food stuff.

As it is well known, the cooking of food stuff requires bringing it over a determined period of time to, and maintaining it at an appropriate temperature.

Said temperature corresponds for the most part of food stuff to the boiling point of the liquid (water and/or dressings), into which the food stuff is immersed.

Said liquid is brought to the boiling temperature by an external heat source, whereupon any subsequent heat supply only serves to re-integrate the calories lost consequent upon the container's heat dispersion.

A further heat supply to keep the liquid boiling cannot be conveniently proportioned in practice.

Furthermore, water or generally speaking the liquid into which the food stuff is immersed is subject to a subsequent evaporation process and may in turn overflow the container with the possibility, in the case of gas cookers, of blowing the flame out.

In both cases further there occurs a considerable blackening and/or soiling of pots, requiring therefore a longer time for their cleaning.

It should be noted finally that the traditional cooking method, besides causing the above-outlined inconveniences, involves an unnecesssary and expensive consumption of fuel gas.

Furthermore, due to the reasons referred to above, the food stuff requiring a long cooking involve a continuous watch, thereby preventing practically from exerting other activities.

Said inconveniences are instead obviated by the utilization of the particular container according to the present invention.

Said container is made up so as to almost completely insulate the pot or other similar cooking means with its content when the latter is introduced therein.

More accurately, the container of this invention is built up of a block, consisting of expanded plastic material, preferably polystyrene or polyurethane, showing high heat-insulating properties.

Inside said block there is formed a recess, which shows such a dimension and shape as to serve as a seat to receive the pot to be heat insulated.

After the content of the latter has been brought to the boiling temperature, the pot is introduced into said recess, thereby preventing practically any heat dispersion.

In this manner, it is no longer necessary to provide for a further and continuous heat supply to maintain the content of the pot at the right temperature, which may thus reach the desired cooking point without the utilization of further fuel gas.

Furthermore, since the container of this invention does not subject the food stuff to an exceedingly high temperature, it permits to retain all organoleptic properties of the food stuff itself.

The block, consisting of heat-insulating material, wherein there is formed the pot receiving recess, may be inserted into the stove or a kitchen cabinet, being suitably built and/or of the modular type, so as to be possibly integrated with other cabinets of the same style arranged side-by-side, or the block itself, suitably covered with plastic or metal material, may be used as a portable container.

A conveniently dimensioned and thermostat-controlled small heat source may be located on the recess bottom, adapted to re-integrate the least heat dispersions likely to occur during the preparation of the various kinds od food stuff, requiring a particularly long cooking time.

These and other features of a functional and constructional nature of the heat insulated container according to the present invention could be better understood from the following detailed description and accompanying drawings, representing a preferred but non-limiting embodiment example of the invention, wherein:

FIG. 1 shows in a perspective view a cabinet for storage and support of said container;

FIG. 2 represents in a perspective view the same cabinet as shown in FIG. 1 in open condition so that the room adapted to contain the pot may be well viewed;

Figure 3:
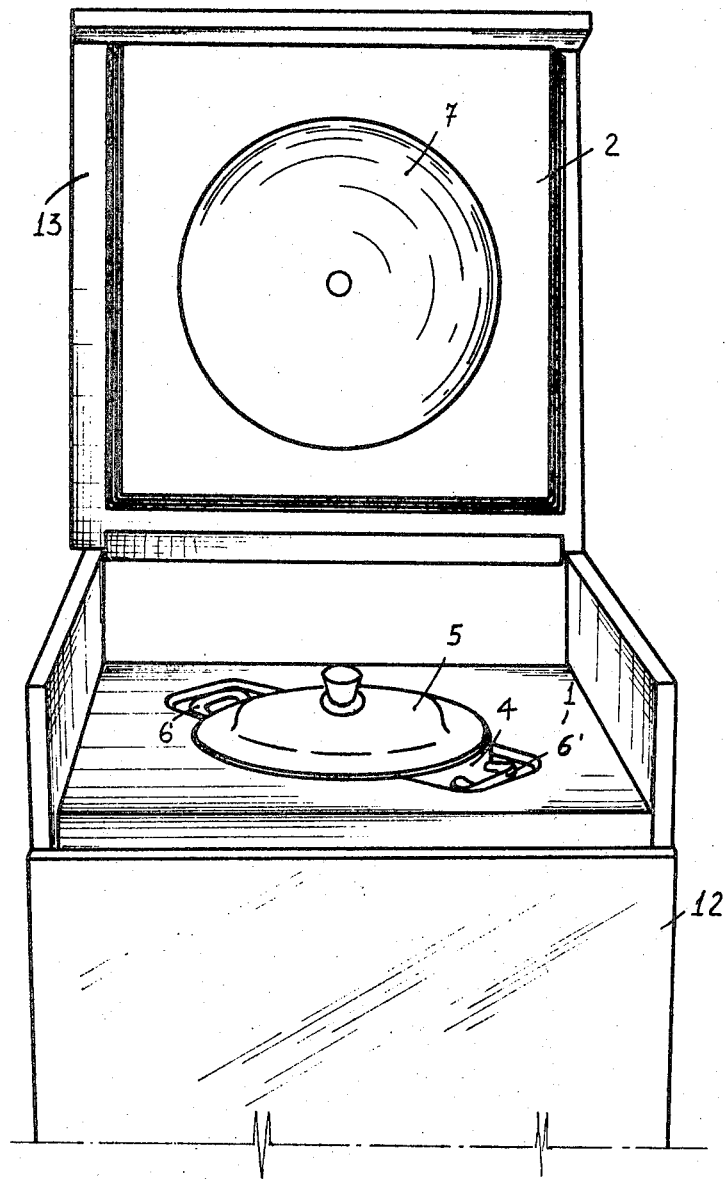
FIG. 3 shows in a perspective view the upper portion of the same cabinet as above.
Figure 4:
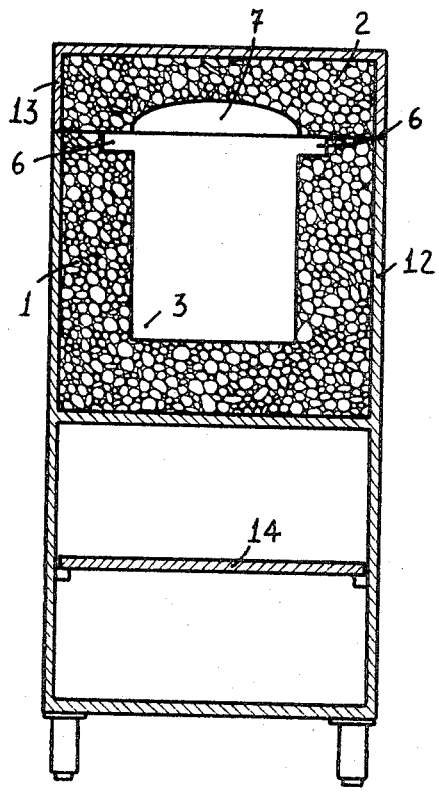
FIG. 4 depicts the cross section with a vertical plane of said cabinet.
Figure 5:
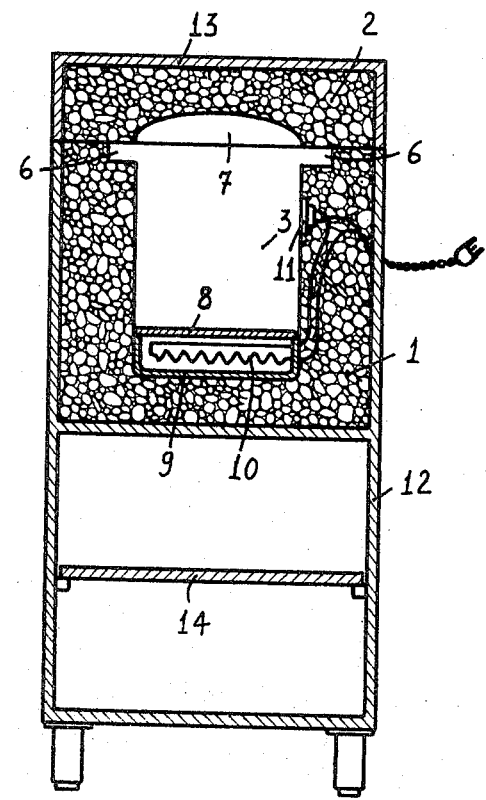
FIG. 5 represents the same section of the detail as shown in the preceding figures, in the case the instant container is also provided with a heat source.

Referring now particularly to the numeral symbols on the various figures of the accompanying drawings, the heat insulated container of this invention consists of a heat-insulating material block 1, provided with a movable upper portion 2 made out of the same material.

Said block 1 and related movable upper portion 2 show as a whole a parallelepipedal shape and are preferably built by using expanded plastic material such as for example expanded polystyrene or polyurethane.

In said block 1 there is formed a recess 3, being lined with a prefabricated plastic sheet, adapted to contain in its entirety the body of a pot 4 with related handles 6'.

To this effect, there are provided in the recess 3 two seats 6, designed to receive the handles 6'.

In the upper portion 2 of the block 1 there is formed a seat 7 to receive the cover 5.

On the bottom of the recess 3 may be possibly placed a heating plate 8, being suitably supported and enclosed on the lower part by an insulating structure 9.

Said heating plate 8 may be heated by an electrical resistance 10 via a thermostat 11, disposed on the vertical wall of said recess 3.

The thus obtained block 1 is inserted into a cabinet 12, fitted with an overturning cover 13 to which there is fastened the upper portion 12 so that the latter, when the cabinet, is closed, perfectly meets face to face with the block 1.

The cabinet 13 itself may be provided on its lower portion with rooms being delimited by the shelves 14 and the door 15 and obviously show any appearance whatever.

From the foregoing description and perusal of the various figures on the accompanying drawings it becomes apparent that a great functional and practical performance is provided by the heat insulated container of this invention, adapted to complete the cooking of food stuff without heat supply.

It is, of course, understood that said heat insulated container and related manufacturing and functional method have been described and illustrated in the foregoing specification by way of a non-limiting example.

Several changes and modifications as to shape, dimensions or structure could be introduced therein upon putting it into effect, without departing from the scope of the invention.

I claim:

1. A heat insulated container, particularly adapted to receive and accommodate a cooking pot containing a hot food, comprising two blocks of expanded plastic heat insulating material, each having a parallelopiped configuration, one of said blocks forming the bottom portion of the container, and being provided with a first recess which is adapted to receive and accommodate a cooking pot in contact with the heat insulating material of which the block is formed, and lined with a plastic sheet material, and additional recesses to accommodate handles of said pot; the other of said blocks forming the top portion of said container, and including a recess that is adapted to accommodate a lid of said cooking pot; an electrical heating plate located at the bottom of said first recess and including an insulated resistance element and a thermostat; and cabinet means including a first cabinet member accommodating said one block, and a second cabinet member accommodating said other block and being hingedly connected to said first cabinet member.

* * * * *